Dec. 10, 1929.  J. A. STRIPLING  1,739,426
PLANT PROTECTOR
Filed March 30, 1928
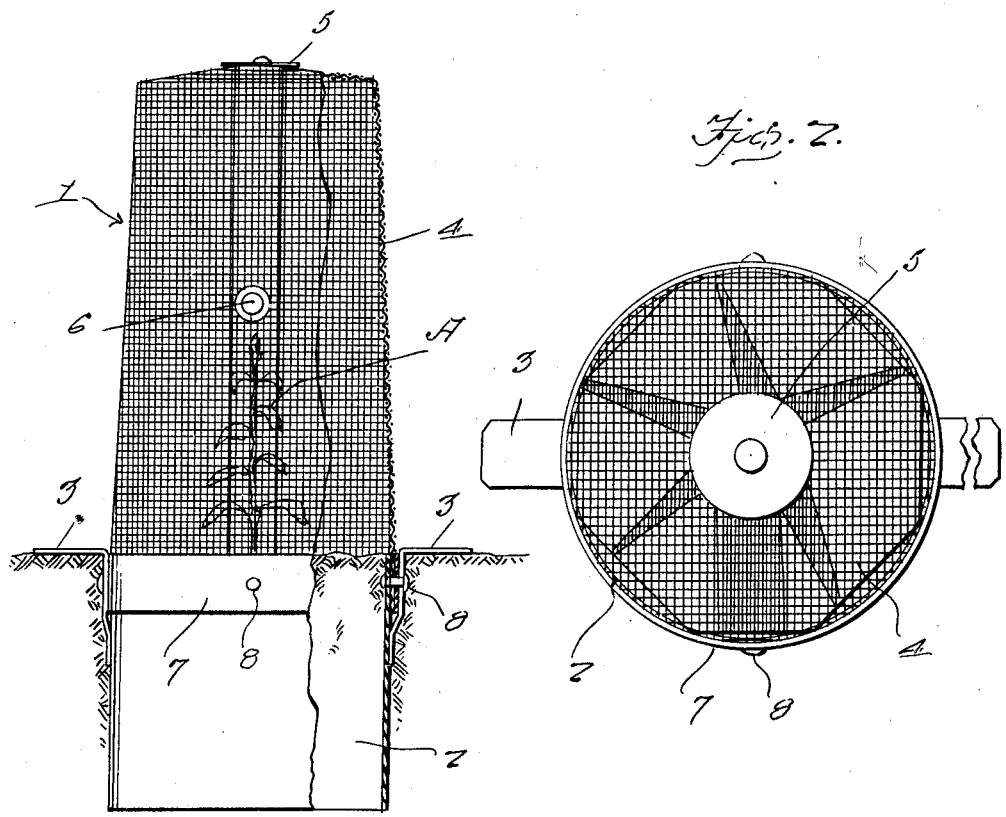
Inventor
J. A. Stripling
By Clarence A. O'Brien
Attorney Patented Dec. 10, 1929

1,739,426

UNITED STATES PATENT OFFICE

JULIUS A. STRIPLING, OF FORT DODGE, IOWA

PLANT PROTECTOR

Application filed March 30, 1928. Serial No. 265,831.

The present invention relates to improvements in protecting devices for plants and has for its principal object to provide a simple and efficient device that can be readily and easily positioned over the plant, means being provided for anchoring the protector in the ground, the protector being of such construction as not to interfere with the growth of the plant.

Considerable difficulty is experienced in protecting growing plants against bugs and cut worms and it is therefore one of the principal aims of the present invention to provide a simple and efficient device that can be placed over the growing plant to prevent the same being reached by insects, the body portion of the protector being formed of wire mesh material so that air and light as well as water can be supplied to the growing plants without necessitating the removal of the protector after the same has once been positioned around the plant.

A still further object is to provide a plant protector of the above mentioned character which is simple in construction, inexpensive, strong and durable and further well adapted to the purpose for which it is designed.

Other objects and advantages of the invention will become apparent from the following description when taken in connection with the accompanying drawing.

In the accompanying drawing wherein like reference characters indicate corresponding parts throughout the same:

Figure 1 is a view partly in elevation and partly in section of the plant protector embodying my invention showing the same in position around a plant, and Figure 2 is a top plan view of the device.

In the drawing wherein for the purpose of illustration is shown the preferred embodiment of my invention, the numeral 1 designates generally my improved plant protector, the same comprising a metallic anchoring base 2 which is in the form of an open ended cylinder, and which base is adapted to be driven downwardly into the ground through the medium of the diametrically opposed right angularly disposed ears 3 that are secured to the outer side of the upper portion of the cylindrical base.

The protector further includes the provision of the perforated body 4 that is preferably constructed of wire mesh material, the same being of any suitable shape in cross section; in the present instance, the major portion of the perforated body is of hexagonal design. The top of the body is closed, and this is accomplished by folding inwardly the upper edges of the piece of wire mesh material from which the body is constructed and securing the inwardly disposed end portions by a plate 5. The longitudinal free edges of the wire mesh material are secured together by any appropriate fastening means such as is shown at 6, it being understood of course that the side edges of the wire mesh material are disposed in overlapping relation.

The open lower end of the perforated body 4 is disposed around the upper end of the cylindrical base 2 and a metallic band or ring 7 encircles the lower portion of the wire mesh body and is secured to the upper portion of the cylindrical base by any appropriate fastening means shown at 8 and as is more clearly disclosed in Figure 1, the vertical portions of the right angularly disposed ears 3 extend upwardly along the outer sides of the band and the securing means for the band also extends through the ears.

As is more clearly shown in Figure 1, the perforated body tapers gradually toward its upper end and this body is of such size as to extend over a growing plant A, and the inner walls of the body will be spaced from the plant so as not to interfere with the growth of the plants.

When the protector is positioned over the plant in the manner as shown in the drawing, said plant will be protected from insects and the anchoring base 2 will maintain the protector rigidly in position so that the same cannot be blown away or otherwise dislodged from its proper position over the plant.

The simplicity of my device enables the protector to be constructed at a very low cost and yet be strong and durable.

While I have shown the preferred embodiment of my invention, it is to be understood that various changes in the size, shape and arrangement of parts may be resorted to without departing from the spirit of the invention and the scope of the appended claims.

Having thus described the invention, what I claim is:—

1. A plant protector comprising an open ended cylinder adapted to be anchored in the ground around the plant, a perforated body open at its lower end and closed at its upper end for disposition around the plant, the lower open end of the perforated body encircling the upper portion of the cylinder, a band extending around the lower edge portion of the perforated body and being secured to the adjacent portion of the cylinder, and offset brackets secured to the upper portion of the cylinder for limiting the insertion of the cylinder in the ground.

2. A plant protector of the class described comprising an open ended cylinder adapted to be embedded in the ground around a growing plant, a body for enclosing the growing plant, said body being formed of a single piece of wire mesh material, the free edges of the material being disposed in overlapping relation and secured together, the upper edge of the material being bent inwardly to provide a closed upper end for the body, the lower portion of the wire mesh body being secured to the upper portion of the anchored cylinder, and laterally extending arms secured to the upper portion of the cylinder for limiting the insertion of the cylinder into the ground.

In testimony whereof I affix my signature.

JULIUS A. STRIPLING.